United States Patent
Vijayaraghavan et al.

(10) Patent No.: US 10,855,677 B2
(45) Date of Patent: Dec. 1, 2020

(54) VOICE-BASED VERIFICATION FOR MULTI-FACTOR AUTHENTICATION CHALLENGES

(71) Applicant: Amazon Technologies, Inc., Seattle, WA (US)

(72) Inventors: Aravindhan Vijayaraghavan, Redmond, WA (US); Sudheer Reddy Battula, Bothell, WA (US); Kumar Brahnmath, Bellevue, WA (US); Thomas Haider, Seattle, WA (US); Jacob Harding, Seattle, WA (US); Ram Kakkad, Seattle, WA (US); Rishikesan Rangarajan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 189 days.

(21) Appl. No.: 16/205,948

(22) Filed: Nov. 30, 2018

(65) Prior Publication Data

US 2020/0177581 A1    Jun. 4, 2020

(51) Int. Cl.
*H04L 29/06* (2006.01)
*G06F 21/31* (2013.01)
(Continued)

(52) U.S. Cl.
CPC ..... *H04L 63/0838* (2013.01); *G06Q 20/4014* (2013.01); *G10L 15/26* (2013.01);
(Continued)

(58) Field of Classification Search
CPC ........... H04L 29/06; H04L 9/32; H04L 63/10; G06Q 20/40
(Continued)

(56) References Cited

U.S. PATENT DOCUMENTS

| 7,512,567 B2 | 3/2009 | Bemmel et al. |
| 8,769,642 B1 * | 7/2014 | O'Neill ................. H04L 63/102 726/5 |

(Continued)

OTHER PUBLICATIONS

PCT/US2019/060330 , "International Search Report and Written Opinion", dated Feb. 24, 2020, 11 pages.

*Primary Examiner* — Haresh N Patel
(74) *Attorney, Agent, or Firm* — Kilpatrick Townsend & Stockton LLP

(57) ABSTRACT

The application describes an authentication process that incorporates voice commands with an HTTP interface module to perform a multifactor authentication (MFA) process. For example, a first computer system may initiate the MFA process by sending, with a HTTP interface module maintained by the first computer system, a request to initiate the MFA process to the second computer system. The MFA process may also transmit an one-time password (OTP) to a first user device. The first computer system may receive an audible recitation of the OTP from a second user device. The OTP may be parsed and used to generate an HTTP request. The HTTP interface module may send the HTTP request to the second computer system. When the second computer system authenticates the user based at least in part on the non-audible file, the first computer system may receive confirmation of authentication of the user to initiate the transaction.

20 Claims, 7 Drawing Sheets

(51) Int. Cl.
*H04L 9/32* (2006.01)
*G06Q 20/40* (2012.01)
*G10L 15/26* (2006.01)
*H04N 21/422* (2011.01)
*H04N 21/441* (2011.01)
*G06F 15/16* (2006.01)

(52) U.S. Cl.
CPC ..... *H04L 9/3271* (2013.01); *H04N 21/42221* (2013.01); *H04N 21/441* (2013.01); *H04L 2463/082* (2013.01)

(58) Field of Classification Search
USPC .............................................................. 726/7
See application file for complete search history.

(56) References Cited

U.S. PATENT DOCUMENTS

| | | | | |
|---|---|---|---|---|
| 8,973,108 | B1* | 3/2015 | Roth | H04L 9/3213 726/5 |
| 9,240,886 | B1* | 1/2016 | Allen | H04L 9/3213 |
| 9,942,752 | B1* | 4/2018 | Marimuthu | H04L 63/1483 |
| 10,057,227 | B1* | 8/2018 | Hess | H04L 63/08 |
| 2008/0141353 | A1* | 6/2008 | Brown | |
| 2013/0097682 | A1* | 4/2013 | Zeljkovic | H04L 9/3231 726/7 |
| 2015/0089585 | A1* | 3/2015 | Novack | H04L 63/1433 726/3 |
| 2015/0187359 | A1* | 7/2015 | Bhaskaran | G10L 15/265 704/235 |
| 2016/0118050 | A1* | 4/2016 | Arslan | G10L 25/63 704/235 |
| 2016/0315771 | A1* | 10/2016 | Chalamala | H04L 9/321 |
| 2017/0011406 | A1* | 1/2017 | Tunnell | H04W 12/06 |
| 2017/0279795 | A1* | 9/2017 | Redberg | H04L 63/0861 |
| 2018/0007060 | A1* | 1/2018 | Leblang | H04L 63/0853 |
| 2018/0146370 | A1* | 5/2018 | Krishnaswamy | G06F 16/951 |
| 2018/0176212 | A1* | 6/2018 | Nair | G06F 21/32 |
| 2018/0293988 | A1* | 10/2018 | Huang | G10L 17/20 |
| 2018/0309581 | A1* | 10/2018 | Butler | H04L 63/0861 |
| 2019/0362312 | A1* | 11/2019 | Platt | H04L 65/4053 |
| 2019/0373136 | A1* | 12/2019 | Diaz | G06F 21/64 |
| 2019/0378519 | A1* | 12/2019 | Dunjic | G06F 21/606 |
| 2020/0105254 | A1* | 4/2020 | Sarir | H04W 4/02 |
| 2020/0177581 | A1* | 6/2020 | Vijayaraghavan | H04L 63/0861 |

* cited by examiner

500

| ABC 123 |

| ABC ! * " " |

| 12345678 |

| Oranges |

VOICE-BASED VERIFICATION FOR MULTI-FACTOR AUTHENTICATION CHALLENGES

BACKGROUND

Authentication systems are prevalent in an ever-increasing online world. These authentication systems attempt to authenticate users when the only interactions that users have with the authentication systems are digital interactions. The authentication systems then must rely on confirming the identity of the users based on what the user knows, what the user has, or who the user is.

New methods of authenticating users are needed when the user's interactions with these systems change as well. For example, voice-based systems are becoming more prevalent, yet little is done to ensure that users are properly authenticated. This creates a security risk when users are not properly authenticated and improvements are necessary.

BRIEF DESCRIPTION OF THE DRAWINGS

Various embodiments in accordance with the present disclosure will be described with reference to the drawings, in which:

FIG. 5 illustrates some examples of one time passwords, in accordance with at least one embodiment;

DETAILED DESCRIPTION

Figure 1:
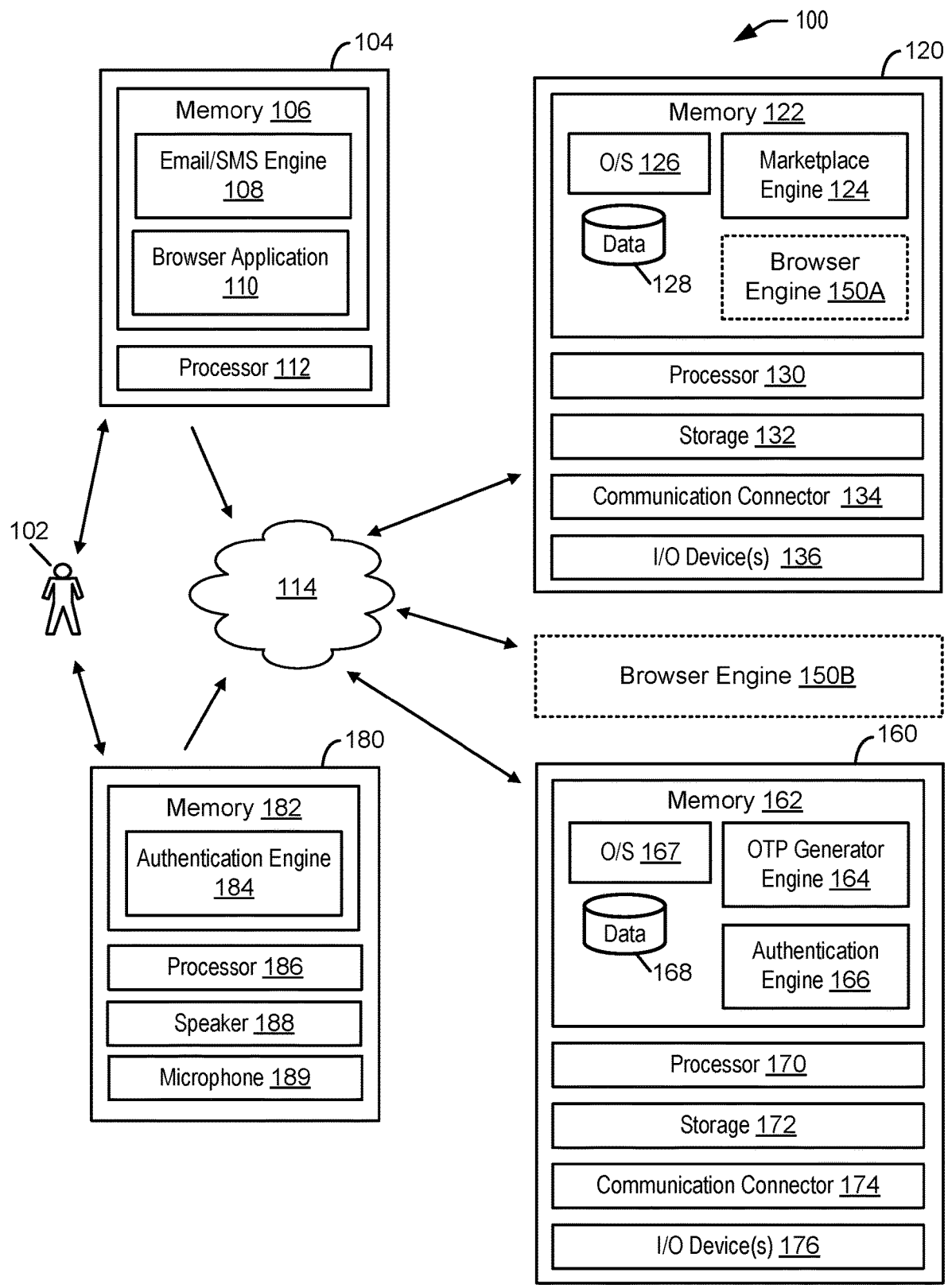
FIG. 1 illustrates an example architecture for providing multifactor authentication, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide systems and methods for authenticating a user. In at least one embodiment, a first computer system (e.g., merchant, etc.) may receive a request to initiate a transaction for user. The user may be associated with an account maintained by a second computer system (e.g., bank or third party, etc.). The first computer system may initiate a multifactor authentication (MFA) process. The MFA process may comprise sending, with a hypertext transfer protocol (HTTP) interface module maintained by the first computer system, a request to initiate the MFA process to the second computer system. The MFA process may also transmit a multi-use password or one-time password (OTP) (used interchangeably) to a first user device (e.g., a mobile device, a device with short message service (SMS) or email messaging, etc.). The first computer system may receive an audible recitation of the OTP from a second user device (e.g., a device with a microphone and speaker, etc.). The OTP may be parsed and stored as a non-audible version of the OTP. The HTTP interface module may transmit the non-audible format to the second computer system. When the second computer system authenticates the user based at least in part on the non-audible version of the OTP, the first computer system may receive confirmation of authentication of the user to initiate the transaction.

In a sample illustration, a user identifies goods to purchase with a merchant. The goods may be audibly identified by the user when the user speaks "purchase a dozen eggs" to a second user device with a microphone and speaker. The second user device may store account credentials of the user, so that the user may not need to identify the account with the purchase request. Upon receiving the purchase request, the second user device transmits a request to charge the account to a bank. The bank generates and transmits an one-time password (OTP) to a first user device associated with the account. The user receives the OTP via the first user device and audibly speaks the OTP to the microphone associated with the second user device. The OTP may be translated by the second user device to a non-audible format, and then transmitted to the bank. The bank may compare the received OTP with the OTP that was originally sent by the bank to the first user device. When the two sources of OTP match, the bank may transmit a confirmation message of authentication to the second user device. The second user device may translate the confirmation to an audible format and provide the audible confirmation of authentication to the user via the speaker at the second user device (e.g., "authentication complete").

In some examples, a hypertext transfer protocol (HTTP) interface module may be implemented to incorporate and improve authentication processes for legacy computer systems, including the second computer system. For example, a legacy computer system may require a password to be provided in a digital form and transmitted to the legacy computers. This form may be available via a network. Customarily, the user would log in to a browser application to access the form and manually provide the password to the browser application. The populated form would then be transmitted to the bank. However, in some embodiments of the application, the user may want to interact with a user device audibly and not by logging into a browser application. This may cause the user to interact with the user device audibly for everything other than providing a password, which the user would need to provide manually. These additional interactions guide the user away from audibly providing responses and interacting with user devices.

The HTTP interface module may be provided to help the user continue to provide audible responses with a user device, as well as populating the form for the legacy computer system. For example, the user may receive an OTP and provide the OTP audibly to the user device. The user device may parse the audible recitation of the OTP and convert it to a non-audible version of the OTP. The user device may transmit the non-audible version to a browser engine that maintains the form on behalf of the legacy computer system. The browser engine may receive the non-audible version comprising the OTP and populate the form on behalf of the user. The populated form may be transmitted to the legacy computer system to process for authentication without causing the legacy computer system to be updated for the audible interaction between the user and the user device. The legacy system thus receives the OTP as text (via a form or API) and the user is enabled to audibly interact with the user device.

The HTTP interface module may be maintained by the first computer system or may comprise a stand-alone browser engine. In some examples, the HTTP interface module may comprise a headless browser that receives a redirect uniform resource locator (URL) (e.g., pointing to the form) from the bank or third-party source. In some examples, the HTTP interface module may comprise an API to accept the OTP. The API may comprise a set of subroutine definitions, communication protocols, and tools for receiving and transmitting the OTP to the second computer system for authentication. The OTP may accompany a transmission to the second computer system (via the populated form or the API) in order to complete the authentication of the user associated with the account.

When an API is used, a sample illustration may begin with the user receiving the OTP from a second computer system at a first user device. The first user device may include a network connection to receive the OTP from the second computer system. The user may speak the OTP to a second device. The second user device may include at least a speaker and microphone. The second user device may translate the audible OTP to text and transfer the text to the API. The API may provide an interface for accepting the transferred, text-based OTP on behalf of the second computer system. The second computer system may compare the received OTP with a stored OTP in a data store. When the two sources of OTP match, the second computer system may transmit a confirmation of authentication to the first user device (e.g., via email or SMS) or the second user device (e.g., to translate to audio and provide via the speaker, etc.).

In some examples, the user may initially receive the OTP from a second computer system (e.g., bank or third party service, etc.) at a first user device. The first user device may include a network connection as well as one or more applications to receive electronic communications (e.g., email, text messages, etc.).

In some examples, the user may speak the OTP to a second user device. The second user device may include at least a microphone to receive the audible recitation of the OTP. The second user device may translate the audible OTP to text and transfer the text to a HTTP interface module.

The multi-use password or one-time use password (OTP) may be used as part of a multifactor authentication (MFA) process. An MFA process may authenticate a user using more than one authentication factor. For example, the MFA process may comprise two of three possible factors. The potential factors may include one or more knowledge factors (e.g., what you know), possession factors (e.g., what you have), and inherent factors (e.g., who you are). In some examples, the identification of the second user device (e.g., the device that comprises email and SMS messaging) may correspond with at least one possession factor of the MFA process. The contents of the SMS that include the OTP may correspond with at least one knowledge factor of the MFA process. In these examples, the use of the second user device associated with the account and the OTP may correspond with two factors for confirming authentication in the MFA process.

Embodiments of the application may comprise translating a human voice that is reciting a password, alphanumeric string of characters, or phrase into digital audio format. The recitation of the human voice speaking may be recorded and stored by a computer system to enable reproduction of the digital audio. In some examples, the digital audio refers to a digital representation of the audio waveform for processing, storage, or transmission. When analog sound waves are stored in digital form, each digital audio object can be decomposed into a series of samples. The audio format may comprise a format for storing digital audio data on a computer system. The bit layout of the audio data may correspond with the audio coding format and can be uncompressed, or compressed to reduce the file size, and may use lossy compression.

Data may also be transmitted in non-audible formats. These non-audible formats may comprise a standard way that information is encoded for storage in a digital storage medium. The non-audible format may specify how bits are used to encode information (e.g., text, Hypertext Markup Language (HTML), Extensible Markup Language (XML), etc.) that can contain any stream of characters, including possible control characters, and may be encoded in one of various character encoding schemes.

FIG. 1 illustrates an example architecture for providing multifactor authentication, in accordance with at least one embodiment. The illustration 100 comprises a user 102 with access to a first user device 104 and a second user device 180, a network 114, a first computer system 120, a browser engine 150, and a second computer system 160.

The first user device 104 may be similar to a computing device such as, but not limited to, a mobile phone, a smart phone, a personal digital assistant (PDA), a laptop computer, a desktop computer, a thin-client device, a tablet PC, an electronic book (e-book) reader, etc. In one illustrative configuration, the first user device 104 may include at least one memory 106 and one or more processing units (or processor(s) 112). The processor(s) 112 may be implemented as appropriate in hardware, computer-executable instructions, firmware, or combinations thereof. Computer-executable instruction or firmware implementations of the processor(s) 112 may include computer-executable or machine-executable instructions written in any suitable programming language to perform the various functions described. The first user device 104 may also include geo-location devices (e.g., a global positioning system (GPS) device or the like) for providing and/or recording geographic location information associated with the first user device 104.

The memory 106 may store program instructions that are loadable and executable on the processor(s) 112, as well as data generated during the execution of these programs. Depending on the configuration and type of first user device 104, the memory may be volatile (such as random access memory (RAM)) and/or non-volatile (such as read-only memory (ROM), flash memory, etc.). The first user device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 106 may include multiple different types of memory, such as static random access memory (SRAM), dynamic random access memory (DRAM), or ROM.

Turning to the contents of the memory 106 in more detail, the memory may include an operating system and one or more application programs or services for implementing the features disclosed herein, such as via the email/SMS engine 108, browser application 110, or dedicated applications (e.g., smart phone applications, tablet applications, etc.).

The email/SMS engine 108 may be configured to receive, store, and/or display electronic messages from a message source via an interface (e.g., a display of the first user device 104). The browser application 110 may be configured to receive, store, and/or display a website or other interface for interacting with the first computer system 120.

Additionally, the memory 106 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user-provided response to a security question or a geographic location obtained by the first user device 104.

In some examples, the first user device 104 may be in communication with the first computer system 120 via network 114, or via other network connections. Additionally, the first user device 104 may be part of the distributed system managed by, controlled by, or otherwise part of the first computer system 120 (e.g., a console device integrated with the first computer system 120).

The user 102 may operate the first user device 104 to access, via a network 114, a first computer system 120. In some aspects, the first computer system 120 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the first computer system 120 is executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the first computer system 120 may be in communication with the first user device 104, second user device 180, and/or other service providers via the network 114, or via other network connections. The first computer system 120 may include one or more servers, arranged in a cluster, as a server farm, or as individual servers not associated with one another. These servers may be configured to implement the authentication process described herein as part of an integrated, distributed computing environment.

In one illustrative configuration, the first computer system 120 may include at least one memory 122 and one or more processing units (or processor(s) 130). The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described.

The memory 122 may store program instructions that are loadable and executable on the processor(s) 130, as well as data generated during the execution of these programs. Depending on the configuration and type of first computer system 120, the memory 122 may be volatile (such as RAM) and/or non-volatile (such as ROM, flash memory, etc.). The first computer system 120 or servers may also include additional storage 132, which may include removable storage and/or non-removable storage. The additional storage 132 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 122 may include multiple different types of memory, such as SRAM, DRAM, or ROM.

The memory 122 and the additional storage 132, both removable and non-removable, are examples of computer-readable storage media. For example, computer-readable storage media may include volatile or non-volatile, removable or non-removable media implemented in any method or technology for storage of information such as computer-readable instructions, data structures, program modules, or other data. Additional types of computer storage media that may be present in the first computer system 120 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the first computer system 120. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The first computer system 120 may also contain communications connection(s) 134 that allow the first computer system 120 to communicate with a stored database, another computing device or server, user terminals, and/or other devices on the network 114. The first computer system 120 may also include I/O device(s) 136, such as a keyboard, a mouse, a pen, a voice input device, a touch input device, a display, speakers, a printer, etc.

Turning to the contents of the memory 122 in more detail, the memory 122 may include an operating system 126, data store 128, and one or more application programs or services for implementing the features disclosed herein, such as via marketplace engine 124 and the browser engine 150 (illustrated as 150A and 150B). The browser engine 150 may be incorporated with the first computer system 120 (e.g., browser engine 150A) or part of a standalone engine that is accessible by one or more computer systems (e.g., browser engine 150B). In some examples, when the browser engine 150B is part of a standalone computer system, the browser engine may comprise some or all of the features and functionalities of the computing device illustrated in FIG. 4.

The marketplace engine 124 may be configured to receive an identification of an item or service and provide for display the item or service via a browser application or other software application. One or more users may access the display of these items from the first computer system 120. In some examples, the user 102 may request to initiate a transaction for the items or services with the first computer system 120 using an account maintained by a second computer system 160. The user 102 may be authenticated by the second computer system 160 prior to initiating the transaction, which is further described herein.

The browser engine 150 may be configured to receive, store, and/or display a website or other interface for interacting with the second computer system 160. The browser engine 150 may be configured to provide a hypertext transfer protocol (HTTP) interface module for accepting data from a user device. The HTTP interface module may include, for example, a headless browser or application programming interface (API) that is customarily not displayed for a user device. The browser engine 150 may be configured to accept a password (e.g., the OTP) from the user device (e.g., via the API or other electronic communication protocol). In some examples, the password is used to populate a form within the HTTP interface module. The browser engine 150 may be configured to transfer the populated form to the second computer system 160 via the network 114.

A second computer system 160 is also illustrated in FIG. 1. The second computer system 160 may maintain accounts on behalf of users. The accounts may correspond with funds (e.g., bank account, etc.). The second computer system 160 may also maintain user profiles that correlate users with user devices (e.g., first user device 104) and passwords (e.g., OTP). The user profile may comprise user identification information, user device(s) information, and account information. The second computer system 160 may authenticate users prior to allowing access to the accounts. In some examples, the user 102 may operate a user device to register the account with second computer system 160. In some examples, the first computer system 120 may initiate a transaction, via a network 114, with a second computer system 160 in order to transfer funds from the user's account to a merchant account as part of a transaction process.

Second computer system 160 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the second computer system 160 is executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the second computer system 160 may be in communication with the first user device 104, second user device 180, first computer system 120, and/or other service providers via the network 114, or via other network connections. The second computer system 160 may include one or more servers, arranged in a cluster, as a server farm, or as individual servers not associated with one another. These servers may be configured to implement the authentication process described herein as part of an integrated, distributed computing environment.

In one illustrative configuration, the second computer system 160 may include at least one memory 162 and one or more processing units (or processor(s) 170). The processor(s) 170 may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described.

The memory 162 may store program instructions that are loadable and executable on the processor(s) 170, as well as data generated during the execution of these programs. Depending on the configuration and type of second computer system 160, the memory 162 may be volatile (such as RAM) and/or non-volatile (such as ROM, flash memory, etc.). The second computer system 160 or servers may also include additional storage 172, which may include removable storage and/or non-removable storage. The additional storage 172 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 162 may include multiple different types of memory, such as SRAM, DRAM, or ROM.

The memory 162 and the additional storage 172, both removable and non-removable, are examples of computer-readable storage media. For example, computer-readable storage media may include volatile or non-volatile, removable or non-removable media implemented in any method or technology for storage of information such as computer-readable instructions, data structures, program modules, or other data. Additional types of computer storage media that may be present in the second computer system 160 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the second computer system 160. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The second computer system 160 may also contain communications connection(s) 174 that allow the second computer system 160 to communicate with a stored database, another computing device or server, user terminals, and/or other devices on the network 114. The second computer system 160 may also include I/O device(s) 176, such as a keyboard, a mouse, a pen, a voice input device, a touch input device, a display, speakers, a printer, etc.

Turning to the contents of the memory 162 in more detail, the memory 162 may include an operating system 167, data store 168, and one or more application programs or services for implementing the features disclosed herein, such as a one-time password (OTP) generator engine 164 or the authentication engine 166.

The OTP generator engine 164 may be configured to generate, store, and transmit one or more passwords to a user device. For example, the OTP generator engine 164 may generate a password associated with an account corresponding to a first user device 104. The password may comprise an alphanumeric string that may be unique for the particular user device. In some examples, the password may be generated using an alphanumeric generation algorithm. The OTP generator engine 164 may identify the first user device 104 and transmit the generated the OTP to the first user device 104 via the network 114. The OTP associated with the account may be stored in the data store 168.

The authentication engine 166 may be configured to receive the OTP and compare the received OTP with the stored OTP in the data store 168 (e.g., that was generated by the OTP generator engine 164). The authentication engine 166 may confirm or deny authentication of the first user device 104 based at least in part on the comparison and matching of the received OTP with the stored OTP. For example, when the received OTP and stored OTP match, the authentication may be confirmed. When the received OTP and stored OTP do not match, the authentication may be denied. The confirmation or denial of authentication may be transmitted in an electronic message to the browser engine 150, second user device 180, or other computing device.

A second user device 180 is also illustrated in FIG. 1. Second user device 180 may comprise memory 182, processor 186, speaker 188, and microphone 189. The first user device 104 and second user device 180 may be included in a single computing device, in some embodiments, or separate computing devices, as illustrated with FIG. 1.

The second user device 180 may be similar to a computing device such as, but not limited to, a smart speaker connected to a voice controlled intelligent personal assistant. The second user device 180 may also comprise other devices, including a mobile phone, a smart phone, a personal digital assistant (PDA), a laptop computer, a desktop computer, a thin-client device, a tablet PC, an electronic book (e-book) reader, etc. In one illustrative configuration, the second user device 180 may include at least one memory 182 and one or more processing units (or processor(s) 186). The processor(s) 186 may be implemented as appropriate in hardware, computer-executable instructions, firmware, or combinations thereof. Computer-executable instruction or firmware implementations of the processor(s) 186 may include computer-executable or machine-executable instructions written in any suitable programming language to perform the various functions described.

The memory 182 may store program instructions that are loadable and executable on the processor(s) 186, as well as data generated during the execution of these programs. Depending on the configuration and type of second user device 180, the memory 182 may be volatile (such as random access memory (RAM)) and/or non-volatile (such as read-only memory (ROM), flash memory, etc.). The memory 182 may also include an operating system and one or more application programs or services for implementing the features disclosed herein, such as via the authentication engine 184. Additional components of the second user device 180 are provided with FIG. 4.

The authentication engine 184 may be configured to receive an audible password, translate the audible password to text, and transmit the text to the browser engine 150, first computer system 120, or second computer system 160. The memory 182 may store access credentials and/or other user information such as, but not limited to, user IDs, passwords, and/or other user information. In some examples, the user information may include information for authenticating an account managed by the second computer system 160 or an access request such as, but not limited to, a device ID, a cookie, an IP address, a location, or the like. In addition, the user information may include a user-provided response to a security question or a geographic location obtained by the second user device 180.

The second user device 180 may also comprise a speaker 188 and a microphone 189. The speaker 188 may be configured to audibly provide information by converting analog audio signals into the equivalent air vibrations in order to make an audible sound. The microphone 189 may be configured to accept information from an audible source by translating sound vibrations in the air into electronic signals that are recorded and stored. The information provided or received may be stored in a data store associated with the second user device 180.

In some examples, the first user device 104 and/or the second user device 180 may comprise a television with a remote control for providing the OTP. The remote control may transmit commands via infrared signals to the television. The television may comprise an infrared to text module to receive, process, and translate the transmitted password from the remote control associated with television.

Figure 2:
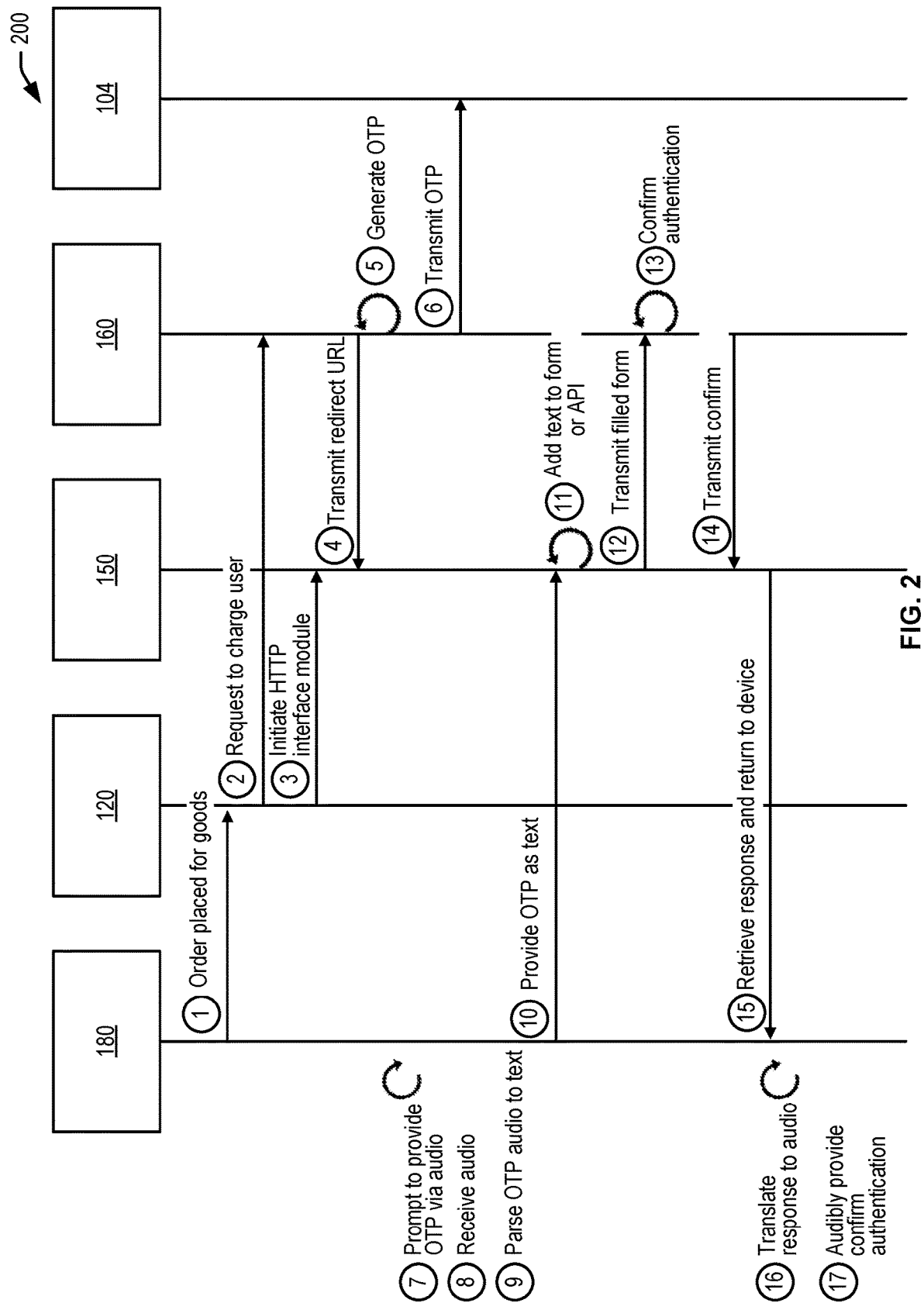
FIG. 2 illustrates a workflow for providing multifactor authentication with a browser engine and an audio enabled device, in accordance with at least one embodiment.

FIG. 2 illustrates a workflow for providing multifactor authentication with a browser engine and an audio enabled device, in accordance with at least one embodiment. The illustration 200 comprises a first user device 104, a second user device 180, a first computer system 120, a browser engine 150, and a second computer system 160.

At step 1, second user device 180 places an order for goods with first computer system 120. For example, a user may identify goods audibly with the second user device 180 (e.g., "purchase a dozen eggs"). The audible recitation of goods may be translated by the second user device 180 into an identification of particular goods (e.g., an item identifier, a stock keeping unit (SKU) A100, etc.). This may include item information including, for example, a price of the item.

At step 2, the first computer system 120 requests to charge the user associated with the second user device 180. When the order for the goods is placed, a transaction may be initiated. The transaction may authenticate the user and authorize the transfer of funds corresponding with the price of the item from the account associated with the user to the seller of the goods.

At step 3, the first computer system 120 may initiate an HTTP interface module by a browser engine 150. The HTTP interface module may correspond with a browser engine 150 that is internally managed by the first computer system 120 or may be a stand-alone browser engine 150 available for use by multiple computer systems.

The HTTP interface module may include a headless browser that can receive a redirect uniform resource locator (URL) (e.g., pointing to the form) from the second computer system 160. In some examples, the HTTP interface module may comprise an API to accept the OTP. The API may comprise a set of subroutine definitions, communication protocols, and tools for receiving and transmitting the OTP to the second computer system 160 for authentication. The OTP may be transmitted to the second computer system 160 via the populated form or the API in order to complete the authentication of the user associated with the account.

At step 4, the second computer system 160 may transmit a redirect uniform resource locator (URL) to the browser engine 150. The redirect URL may direct the browser to an electronic form for accepting a password (e.g., OTP) that is used to authenticate the user associated with the second user device 180. In some examples, the browser may comprise a headless browser that is not displayed for the user at the first user device 104.

At step 5, the second computer system 160 may generate the one time password (OTP). The OTP may be associated with a user and stored in a data store with a user profile. In some examples, the OTP may be linked to an account corresponding with the first user device 104 and/or the second user device 180.

At step 6, the second computer system 160 may transmit the OTP to the first user device 104. In some examples, the OTP may be transferred to the first user device 104 as text via email or SMS. The first user device 104 may be identified with the user profile by a device identifier. The device identifier may comprise a variety of information, including a telephone number, nickname, International Mobile Equipment Identity (IMEI), Mobile Equipment Identifier (MEID), Electronic Serial Number (ESN), International Mobile Subscriber Identity (IMSI), or other identifiers of an user device.

At step 7, the second user device 180 may prompt the user to provide the OTP as an audible recitation to the microphone of the second user device 180. For example, the second user device 180 may play an audible file that includes "please speak the password that you received via email or SMS from your bank." The audible file may be provided via a speaker at the second user device 180.

At step 8, the second user device 180 may receive audio in response to the prompt. For example, the user may access the email or SMS that contains the OTP and speak the OTP to the microphone of the second user device 180. The second user device 180 may receive the audio and store it as an audio file with a user profile associated with the user.

At step 9, the second user device 180 may parse the OTP audio to text. The text format of the OTP may also be stored with the user profile associated with the user.

At step 10, the second user device 180 may provide the OTP as text to the browser engine 150. For example, the second user device 180 may transmit the OTP to an HTTP interface module maintained by browser engine 150.

At step 11, the browser engine 150 may populate the OTP at a form associated with the second computer system 160. The form may correspond with the redirect URL that is transmitted from the second computer system 160 to the browser engine 150. In some examples, the HTTP interface module may comprise a headless browser that contains the form. In some examples, the HTTP interface module may comprise an API that accesses the second computer system 160. When an API is used, the OTP may be transmitted via the API to the browser engine 150.

At step 12, the browser engine 150 may transmit the filled form or data corresponding with the API associated with the HTTP interface module to the second computer system 160.

At step 13, the second computer system 160 may identify the OTP in the form and confirm or deny authentication based on the OTP. For example, the received OTP may be compared with a stored OTP. When the received the OTP matches the stored OTP, the second computer system 160 may confirm authentication. The second computer system 160 may generate an electronic message and include the authentication decision with an electronic message.

At step 14, the second computer system 160 may transmit the electronic message containing the confirmation of authentication to the browser engine 150. In some examples, the browser engine 150 may identify the source of the OTP as the second user device 180 and transmit the confirmation of authentication to the second user device 180.

At step 15, the browser engine 150 may receive the electronic message and determine the authentication decision and/or the destination associated with the authentication decision. For example, the browser engine 150 may identify the second user device 180 as the intended destination based on the account or user profile contained in the electronic message header of the authentication decision. The browser engine 150 may transmit the confirmation of authentication to the second user device 180.

In some examples, the browser engine 150 may compare a first token that is stored with a local data store with a second token that is received from the second computer system 160 in an electronic message. In other examples, the second computer system 160 may receive the locally stored token from the browser engine (e.g., via electronic transmission or API, etc.) and compare the two tokens. When the two sources of tokens match, the browser engine 150 may confirm an authentication of the electronic message from the second computer system 160 and transmit the electronic message to the second user device 180. When the two sources of tokens do not match, the authentication may be denied. An example of this process is provided with FIG. 3.

In some examples, the authentication may be confirmed when more than one determination is satisfied. For example, authentication may be confirmed when (1) the authentication decision identifies a confirmation of authentication and (2) the two sources of tokens match. In some examples, two sources of authentication may be in sync in order to confirm authentication.

At step 16, the second user device 180 may receive and translate the response from the browser engine 150. For example, the authentication decision may be translated from text to an audio file using an application stored with the second user device 180.

At step 17, the second user device 180 may audibly provide the authentication decision via a speaker incorporated with the second user device 180. For example, the second user device 180 may provide "authentication confirmed" or "authentication complete" that is audible from the speaker.

Additional processes may be activated after the authentication is confirmed. For example, the transaction may be initiated by sending an account identifier, a user identifier, and/or funding request to the second computer system 160. The second computer system 160 may confirm that the funds are available in the account of user and initiate a transfer of funds in response to the request. In some examples, a second confirmation may be transmitted to the second user device 180 upon completion of the transfer funds (e.g., "purchase complete"). The second confirmation may also be translated to an audio confirmation and provided via the speaker at the second user device 180.

Figure 3:
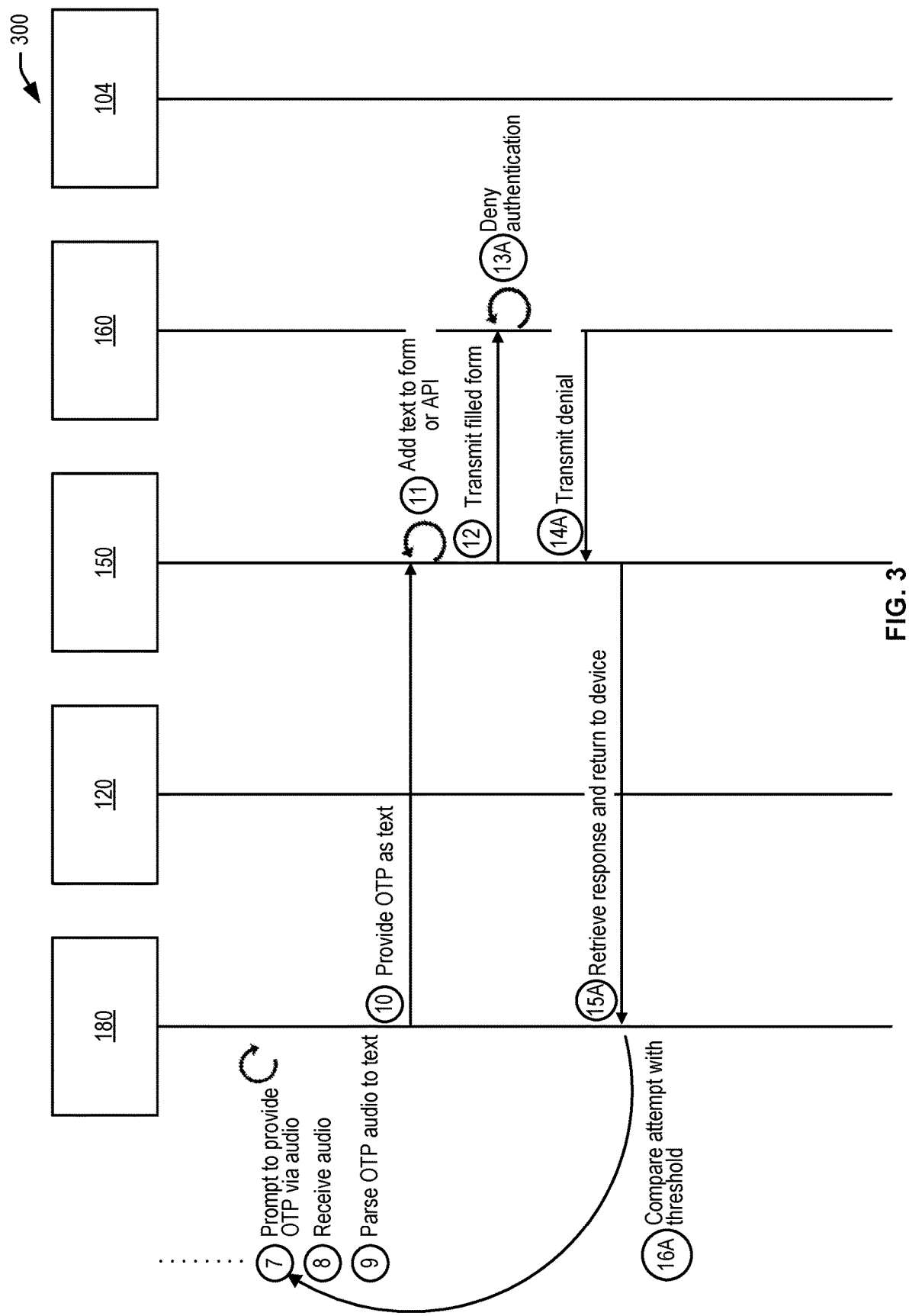
FIG. 3 illustrates a workflow for providing multifactor authentication with a browser engine and an audio enabled device, in accordance with at least one embodiment.

FIG. 3 illustrates a workflow for providing multifactor authentication with a browser engine and an audio enabled device, in accordance with at least one embodiment. The illustration 200 comprises a first user device 104, a second user device 180, a first computer system 120, a browser engine 150, and a second computer system 160.

In some examples, the process illustrated in FIG. 3 may correspond with steps 1-12 of FIG. 2 and the authentication may be denied at step 13, rather than confirmed. In illustration 300, the process may correspond with steps as illustrated in FIG. 3.

At steps 1-12 of FIG. 3, the process may correspond with steps 1-12 of FIG. 2.

At step 13A of FIG. 3, the second computer system 160 may identify the OTP in the form and deny authentication based on the OTP. For example, the received OTP may be compared with a stored OTP. When the received the OTP does not match the stored OTP, the second computer system 160 may deny authentication. The second computer system 160 may generate an electronic message and include the denial of authentication decision with the electronic message.

At step 14A, the second computer system 160 may transmit the electronic message containing the denial of authentication to the browser engine 150. In some examples, the browser engine 150 may identify the source of the OTP as the second user device 180 and transmit the denial of authentication to the second user device 180.

At step 15A, the browser engine 150 may receive the electronic message and determine the authentication decision and/or the destination associated with the authentication decision. For example, the browser engine 150 may identify the second user device 180 as the intended destination based on the account or user profile contained in the electronic message header of the authentication decision. The browser engine 150 may transmit the denial of authentication to the second user device 180.

At step 16A, the second user device 180 may receive and translate the response from the browser engine 150 to determine that the authentication is denied.

In some examples, the second user device 180 may iterate an authentication attempt counter to determine a total number of authentication attempts by the user. The second user device 180 may compare the authentication attempt counter with an authentication threshold. When the authentication attempt counter is less than the authentication threshold, the second user device 180 may return to step 7 to prompt the user to provide the OTP via audio again (e.g., via the microphone at the second user device 180, etc.). The user may provide the correct OTP after the first attempt and the process may return to step 17 to audibly provide the authentication decision via a speaker incorporated with the second user device 180. For example, the second user device 180 may provide "authentication confirmed" or "authentication complete" that is audible from the speaker.

When the authentication attempt counter exceeds the authentication threshold, the second user device 180 may play an audible file that includes, for example, "we could not illicit the appropriate response for authentication." The audible file may be provided via a speaker at the second user device 180. The second user device 180 may also instruct the user to provide the OTP via other means (e.g., by electronically typing the OTP at the first user device 104, etc.). The authentication may continue through the other means.

Figure 4:
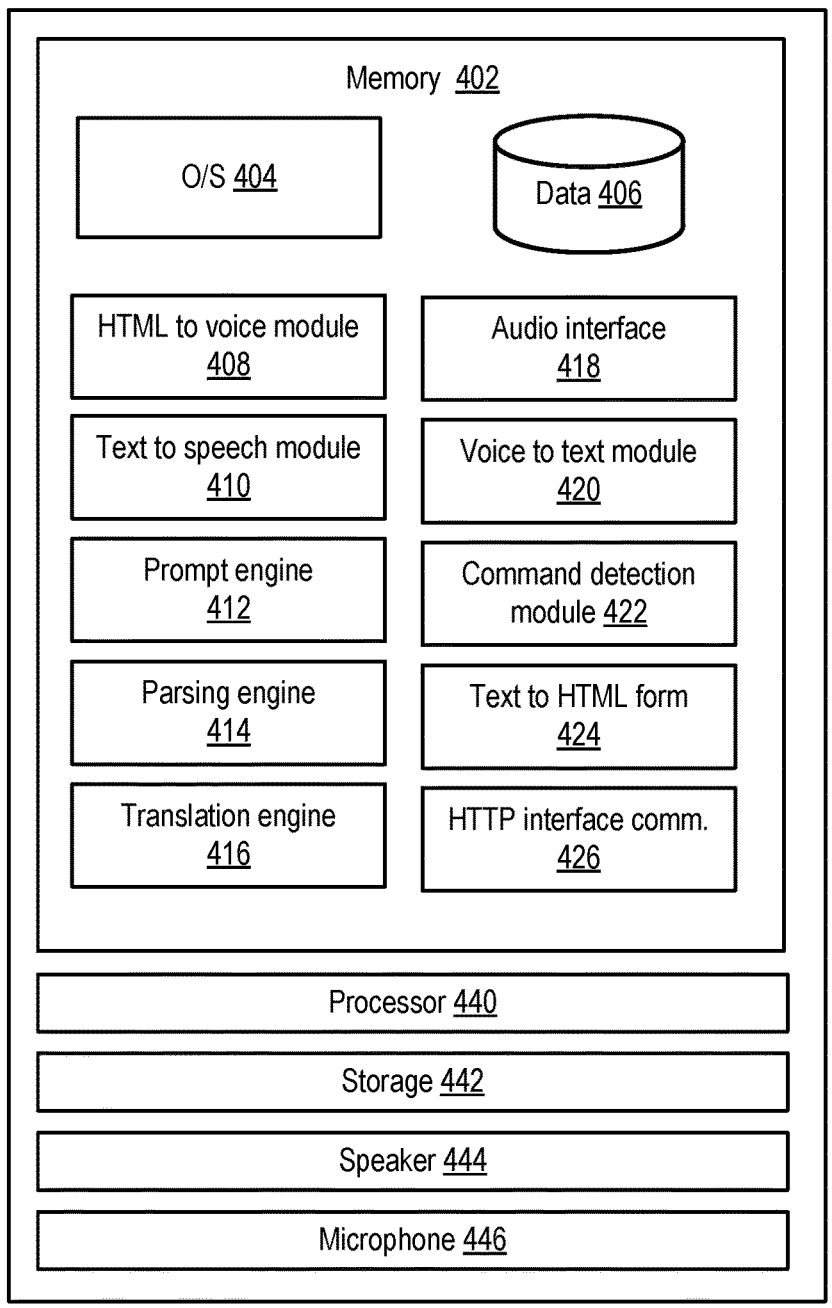
FIG. 4 illustrates an example architecture of a device with a speaker and microphone, in accordance with at least one embodiment.

FIG. 4 illustrates an example architecture of a device with a speaker and microphone, in accordance with at least one embodiment. In some examples, the user device illustrated in example 400 may correspond with a second user device 180 illustrated in FIG. 1. The user device may comprise memory 402, processor 440, storage 442, speaker 444, and microphone 446. Any of these features may be removed (e.g., speaker 442, microphone 446, etc.) without diverting from the essence of the disclosure.

The user device may include one or more processing units (or processor(s) 440). The processor(s) 440 may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described.

The user device may include at least one memory 402. The memory 402 may store program instructions that are loadable and executable on the processor(s) 440, as well as data generated during the execution of these programs. The contents of the memory 402 may include an operating system 404, data store 406, and one or more application programs or services for implementing the features disclosed herein, such as an HTML to voice module 408, text to speech module 410, prompt engine 412, parsing engine 414, translation engine 416, audio interface 418, voice to text module 420, command detection module 422, text to HTML form module 424, and HTTP interface communication 426.

The data store 406 may comprise segmented audio recordings that correspond with text. The text may include words, phrases, syllables, sentences, or other phrases and the corresponding audio file. One or more of the modules stored in memory 402 may look up the audio recordings in the data store and provide the audio recordings via the speaker 444.

In some examples, the modules illustrated herein may be implemented outside of the user device provided in example 400. The input may be transmitted from these modules and/or the output may be received of these modules at the user device.

The HTML to voice module 408 may receive information in a network browser that is defined using hypertext markup language (HTML) and translate the information to an audible format. In some examples, the HTML to voice module 408 may be configured to translate the HTML information to a text format as well. The HTML source information may comprise a text file with HTML tags that define font, color, graphic, and hyperlink effects in the webpage. The HTML to voice module 408 may identify the text in the standard markup language (e.g., based on data tags, etc.) and convert the text to audio utilizing any suitable text to speech technique. The audio may originate from an acoustic data store, including data store 406. The text portions of the HTML source information may correspond with known audio recordings in the data store. The HTML to voice module 408 may match the known text with the recorded audio stored in the data store 406 and provide the recorded audio via the speaker 444 at the user device.

In some examples, the HTML to voice module 408 may implement a HTTP request method, including a POST-GET request method. For example, the POST request may request that a web server accepts the data enclosed in the body of the request message. The POST request may be sent when uploading a file (for conversion to voice) or when submitting a completed web form. The GET request method may retrieve information from the server. In some examples, some data can be passed within the query string of the URL to specify search terms, date ranges, or other information that may define the query.

In some examples, the HTML to voice module 408 may be implemented in a pre-processing step prior to receiving HTML at the user device provided in example 400. In some examples, the audio may be received as a speech string or provided in a different markup language than HTML, including a proprietary to the user device provided in example 400.

The text to speech module 410 (e.g., text to audio module, etc.) may receive information in a non-audible version format and translate the information into an audible format. The text to speech module 410 may identify a first text portion in the text file and convert the text to audio using the text to audio conversions defined in the data store 406 and/or any suitable text to speech technique. In some examples, this module may be configured to translate an authentication confirmation, sent in a text format, to audio and provide the audio via a speaker at the user device.

The prompt engine 412 may provide an audio recording via a speaker. The audio recording may correspond with a prompt that initiates an audible response from user. For example, the prompt may include "please provide your password" or "access your device to look up the password you just received from your bank." When the authentication is denied, the audio recording may instruct the user to provide the password through another method other than audibly to microphone 446 (e.g., text or SMS, email, etc.). The prompt may be stored with the data store 406.

In some examples, the prompt engine 412 may provide the prompt upon receiving an instruction to initiate a transaction for goods or services. As a sample illustration, the user device may receive an audible instruction including "purchase a dozen eggs." This may trigger the prompt to be provided. In some examples, the user device may be unaware of when the password is provided from the bank to the user device. In these instances, the prompt engine 412 may incorporate a delay between receiving the instruction and providing the prompt for the password.

The parsing engine 414 may be configured to compare received audio with known audio segments. When a portion of the received audio is identified as a known audio segment, through a comparison process, the parsing engine 414 may identify the audio segment within the audio file. In some examples, the parsing engine 414 may also be configured to parse data other than audio, including text (e.g., using an optical character recognition (OCR) algorithm, etc.).

The translation engine 416 may be configured to translate an audible value to a textual value and vice versa. As a sample illustration, the translation engine 416 may be configured to translate an audible "A" to a textual "A." The translation engine 416 may be configured to translate a textual "A" to an audible "A."

The audio interface 418 may be configured to provide prompts and responses that correspond with a template. For example, the data store 406 may comprise one or more audible phrases that correspond with actions from the user or other devices. The phrases may include, as sample illustrations, "please speak your password," "confirm that you would like (item identifier)," "authentication confirmed," "authentication denied," and the like.

The voice to text module 420 may be configured to translate an audible value to a textual value. As a sample illustration, the translation engine 416 may be configured to translate an audible "A" to a textual "A." The voice to text module 420 may utilize any suitable voice or speech to text conversion technique.

The command detection module 422 may be configured to receive and store audio upon receiving a keyword in an audio transmission. When the audio keyword is detected, the command detection module 422 may store the remaining audio file for processing. For example, the command detection module 422 may identify a first request to initiate a transaction in the audio transmission (e.g., keyword+"purchase eggs"). In some examples, the storage of the audio file may stop when the audio stops for a predetermined amount of time.

The text to HTML form module 424 may be configured to fill in a form or provide data via an API. For example, the text to HTML form module 424 may determine a user identifier and an OTP stored in a data store 406. The text to HTML form module 424 may add the user identifier and OTP to a corresponding portion of the form (e.g., by finding an HTML tag or header on the form, etc.). The text may be associated with particular parameters, and utilized to generate HTML from parameterized templates. Alternatively, or in addition, the HTML forms may be parsed to identify corresponding parameters utilizing exact matching and/or heuristics.

The HTTP interface communication 426 may provide the HTTP interface module based on a destination address associated with the redirect URL. In some examples, the HTTP interface communication 426 may submit the user identifier and OTP via the API as defined by the second computer system 160 or browser engine 150. In some examples, the electronic communications may be transmitted securely between at least the user device and the first or second computer system or the browser engine, including via an hypertext transfer protocol secure (HTTPS) that may use a secure socket layer (SSL) or transport layer security (TLS) as a sublayer under the HTTP application layering.

Figure 5:
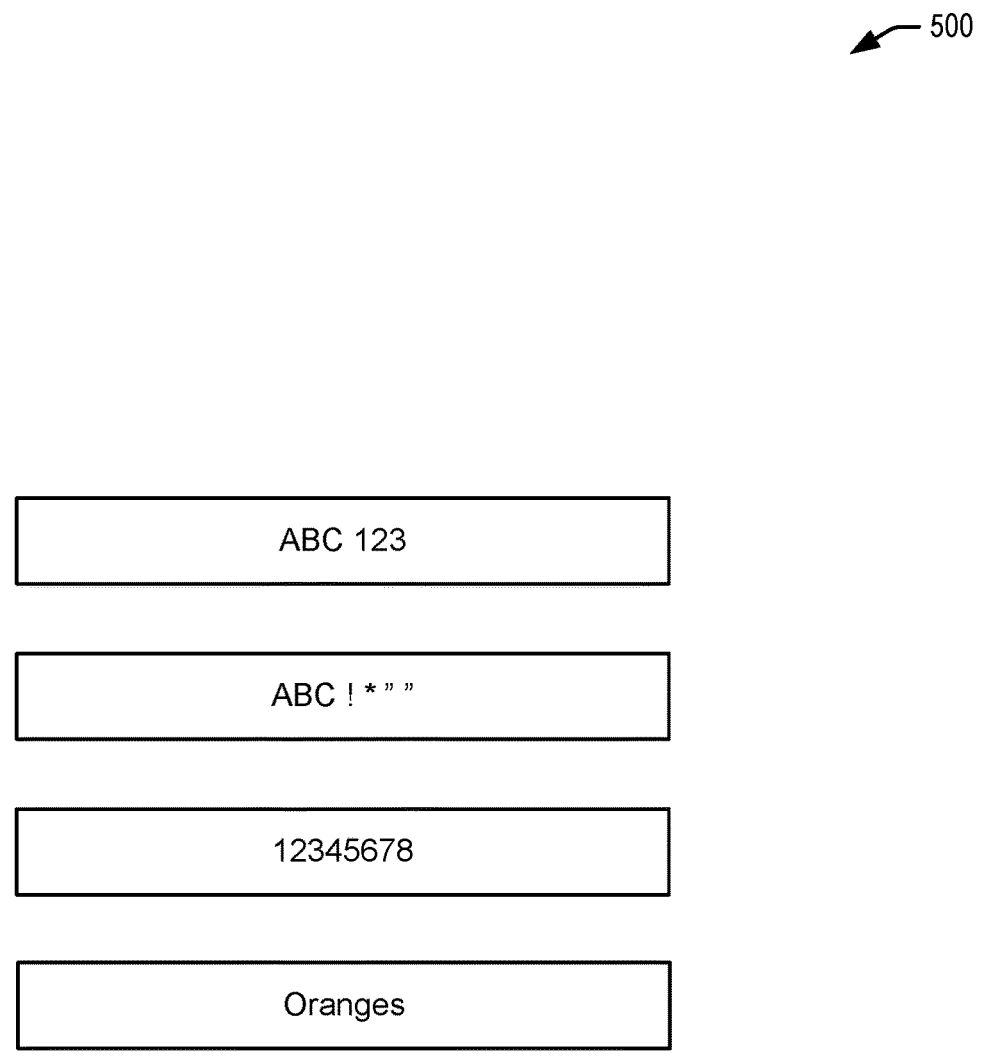

FIG. 5 illustrates some examples of one time passwords, in accordance with at least one embodiment. The password may comprise, for example, an alphanumeric string or values, numeric values, symbols, phrases, a personal identification number (PIN), or other characters that may be spoken and recognized by the second user device 180. As sample illustrations, the OTP may include "ABC 123" or "ABC!*""" or "12345678." In some examples, the OTP may include a word or phrase, like "oranges" or a mother's maiden name.

Figure 6:
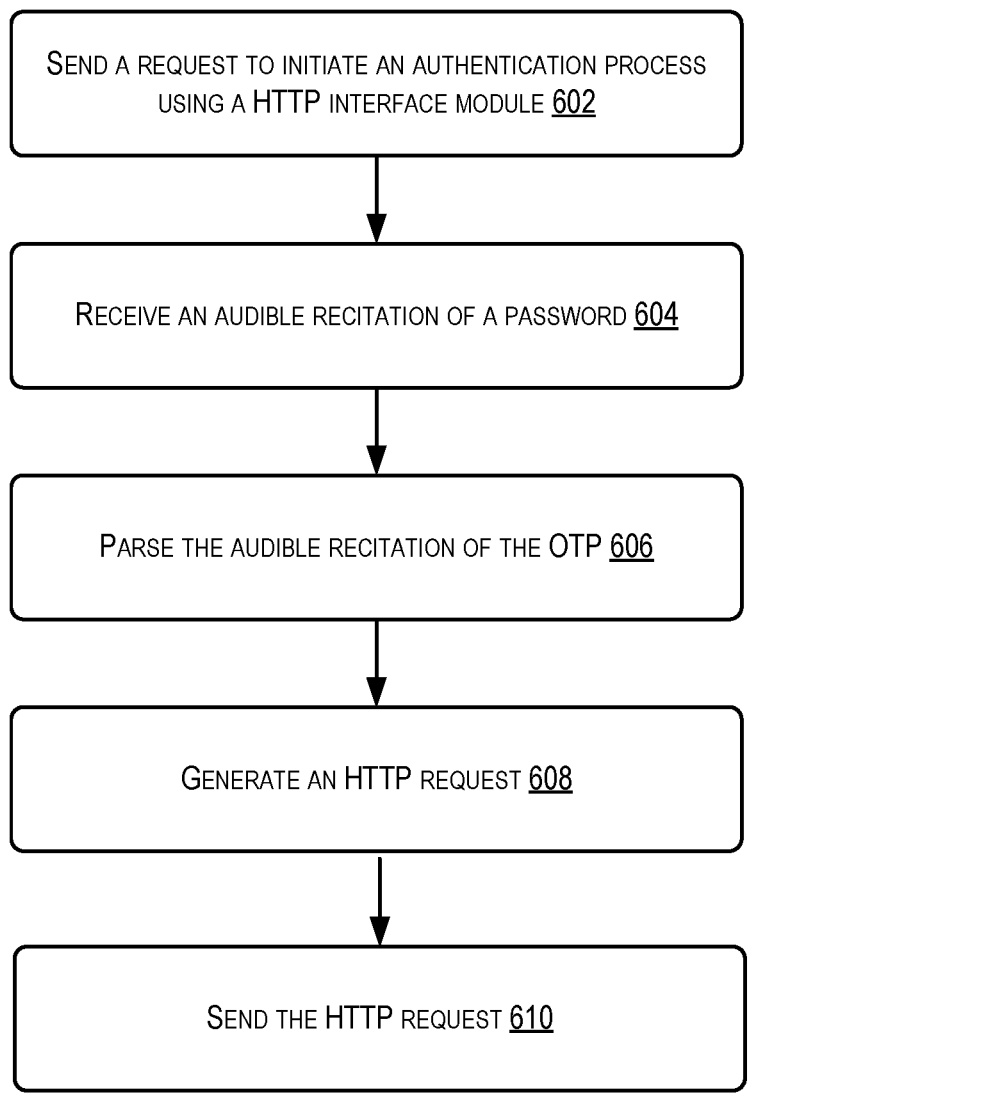
FIG. 6 illustrates an example workflow for a multifactor authentication process, in accordance with at least one embodiment.

FIG. 6 illustrates an example workflow for a multifactor authentication process, in accordance with at least one embodiment. In some examples, the first computer system 120 or second user device 180 (e.g., utilizing one or more of the identified modules) shown in FIGS. 1-3 may perform the process 600 of FIG. 6.

Some or all of the process 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 600 may begin at 602 by sending a request to initiate an authentication process using an HTTP interface module. In some examples, a hypertext transfer protocol (HTTP) interface module maintained by the first computer system may send the request to initiate the authentication process to a second computer.

At 604, an audible recitation of the OTP or other password may be received at a first user device that has been transmitted by the second computer to a separate user device, including the first user device or the second user device.

At 606, the audible recitation of the OTP may be parsed to generate a non-audible version of the OTP.

At 608, an HTTP request may be generated based at least in part on the non-audible version of the OTP.

At 610, the HTTP request may be sent to a second computer system.

Illustrative methods and systems for authenticating users are described above. Some or all of these systems and methods may, but need not, be implemented at least partially by architectures such as those shown at least in FIGS. 1-6 above.

Figure 7:
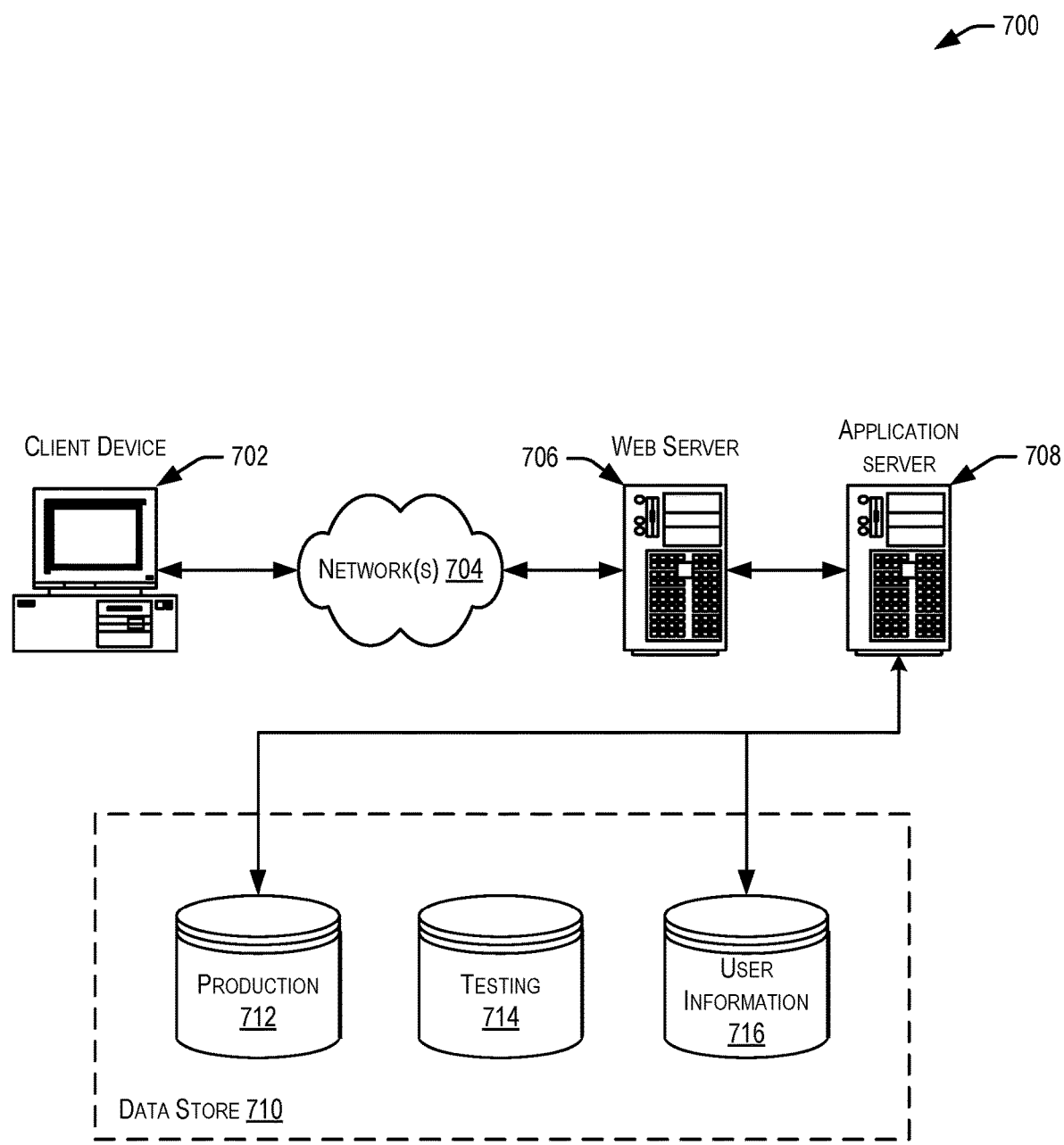
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infra-red network, a wireless network, and any combination thereof In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a first computer system, a first request to initiate a transaction for a user, wherein the user is associated with an account maintained by a second computer system;
initiating, by the first computer system, a multifactor authentication (MFA) process, wherein the MFA process comprises:
sending, with an hypertext transfer protocol (HTTP) interface module maintained by the first computer system, a second request to initiate the MFA process to the second computer system;
receiving, by the first computer system, an audible recitation of an one-time password (OTP) at a first user device that has been transmitted by the second computer system to a second user device;
parsing the audible recitation of the OTP to generate a non-audible version of the OTP;
generating an HTTP request based at least in part on the non-audible version of the OTP; and
sending the HTTP request to the second computer system; and
when the second computer system authenticates the user based at least in part on the non-audible version of the OTP, receiving, with the HTTP interface module by the first computer system, confirmation of authentication of the user to initiate the transaction.

2. The computer-implemented method of claim 1, wherein the HTTP interface module receives, from the second computer system, a redirect uniform resource locator (URL), and the HTTP interface module populates the OTP at a form associated with the second computer system.

3. The computer-implemented method of claim 1, wherein the HTTP interface module is a headless browser application.

4. The computer-implemented method of claim 1, the method further comprising, upon receiving the confirmation of authentication of the user to initiate the transaction, the second user device generates an audible confirmation of the authentication.

5. A computer-implemented method, comprising:
initiating, by a first computer system, a multifactor authentication (MFA) process, wherein the MFA process comprises:
sending, with an hypertext transfer protocol (HTTP) interface module maintained by the first computer system, a request to initiate the MFA process to a second computer system;
receiving an audible recitation of a one-time password (OTP) at a first user device that has been transmitted by the second computer system to a second user device;
parsing the audible recitation of the OTP to generate a non-audible version of the OTP;
generating an HTTP request based at least in part on the non-audible version of the OTP; and
sending the HTTP request to the second computer system; and
when the second computer system authenticates a user based at least in part on the non-audible version of the OTP, receiving, with the HTTP interface module by the first computer system, confirmation of authentication of the user to initiate a transaction.

6. The computer-implemented method of claim 5, further comprising:
receiving a first request to initiate the transaction for the user, wherein the user is associated with an account maintained by the second computer system.

7. The computer-implemented method of claim 6, further comprising:
receiving a second confirmation of authorization of the transaction using the account maintained by the second computer system.

8. The computer-implemented method of claim 5, further comprising:
populating a form with the non-audible version of the OTP, wherein the form accompanies the non-audible version of the OTP in the transmission by the second computer system.

9. The computer-implemented method of claim 5, wherein the OTP is an alphanumeric string.

10. The computer-implemented method of claim 5, further comprising:
upon receiving, by the HTTP interface module, the confirmation of authentication, transmitting a second confirmation of authentication to the second user device.

11. The computer-implemented method of claim 10, further comprising:
upon receiving, by the second user device, the second confirmation of authentication, translating the second confirmation to an audio confirmation; and
providing the audio confirmation to the user.

12. The computer-implemented method of claim 11, wherein the audio confirmation is provided via a speaker at the second user device.

13. A system comprising:
a processor; and
a memory device including instructions that, when executed by the processor, cause the processor to, at least:
receive, by a first computer system, a first request to initiate a transaction for a user, wherein the user is associated with an account maintained by a second computer system;
initiate, by the first computer system, a multifactor authentication (MFA) process, wherein the MFA process comprises:
sending, with an application programming interface (API) maintained by the first computer system, a second request to initiate the MFA process to the second computer system;
receiving, by the first computer system, an audible recitation of a password at a first user device that has been transmitted by the second computer system to a second user device;
parsing the audible recitation of the password to generate a non-audible version of the password;
generating an HTTP request based at least in part on the non-audible version of the password; and
sending the HTTP request to the second computer system; and
when the second computer system authenticates the user based at least in part on the non-audible version of the password, receive, with the API by the first computer system, confirmation of authentication of the user to initiate the transaction.

14. The system of claim 13, wherein the password is provided using a remote control and the first user device is a television.

15. The system of claim 13, wherein the first computer system comprises an infrared to text module to receive and translate the password from a remote control associated with the first user device.

16. The system of claim 13, wherein the second user device comprises a text to audio module to translate an authentication confirmation to audio.

17. The system of claim 13, wherein second user device comprises a command detection module to identify the first request to initiate the transaction.

18. The system of claim 13, wherein the password is a numeric value.

19. The system of claim 13, wherein the non-audible version of the password is utilized to generate hypertext markup language (HTML) from parameterized templates.

20. The system of claim 13, wherein the instructions are further configured to:
   receive the audible recitation of the password from the second user device, wherein the password has been received by the second user device in response to the password being transmitted to the first user device.

* * * * *